May 8, 1962

S. T. VOLL 3,032,938

KNIFE SHARPENER

Filed May 27, 1960

INVENTOR.
SAMUEL T. VOLL

3,032,938
KNIFE SHARPENER
Samuel T. Voll, Great Falls, Mont., assignor of one-tenth to Gadget-Of-The-Month Club, Inc., North Hollywood, Calif., a corporation of California
Filed May 27, 1960, Ser. No. 32,189
7 Claims. (Cl. 51—210)

The present invention consists of a knife sharpener adapted to be mounted on and carried by a knife blade, such as a conventional kitchen butcher knife, or the like, (although not specifically so limited) adjacent the junction of the knife blade with a knife handle thereof. If desired, the knife sharpener may be retained in this position and act as a safety guard. This has the advantage that when the device is to be used as a knife sharpener, it will already be on the blade and it will not be necessary to first find and mount the knife sharpener before using same to sharpen the knife blade.

It is an object of the present invention to provide a novel knife sharpener of the character referred to above, which is of extremely simple, cheap, foolproof construction such as to be conducive to widespread use of the device.

Further objects are implicit in the detailed description which follows and will be apparent to persons skilled in the art after a careful study thereof.

For the purpose of clarifying the nature of the present invention, several exemplary embodiments are illustrated in the hereinbelow-described figures of the accompanying single drawing sheet and are described in detail hereinafter.

FIG. 1 is a side elevational view of one illustrative embodiment of the present invention shown mounted on a knife blade adjacent the junction of the knife blade with a knife handle carrying the knife blade.

FIG. 2 is an enlarged view, partly in vertical section and partly in elevation, taken in the direction of the arrows 2—2 of FIG. 1. It should be noted that in this view the two rotatable grinding members at the bottom of the apparatus are shown in elevation rather than in vertical section.

FIG. 3 is an additionally enlarged, fragmentary, vertical sectional view of the bottom portion of the apparatus illustrated in FIG. 2 showing the two rotatable grinding members in vertical section.

FIG. 4 is a fragmentary view, partly in section and partly in elevation, taken in the direction of the arrows 4—4 of FIG. 3.

FIG. 5 is a view taken in the direction of the arrows 5—5 of FIG. 2 with the knife blade removed.

FIG. 6 is an exploded oblique view of a modified form of one of the two rotatable grinding members illustrated in FIGS. 1-4. It should be understood that each of the two grinding members, in this modification, is similar to the one shown in FIG. 6.

FIG. 7 is a fragmentary sectional view, similar in aspect to FIG. 3, and shows a portion of a left one of the modified form of the two rotatable grinding members shown in FIG. 6, it being understood that each of the two grinding members is similar.

Referring to FIGS. 1-5, for exemplary purposes, one illustrative embodiment of the invention takes a typical exemplary form wherein it comprises a bifurcated housing, indicated generally at 10, having two transversely spaced parallel downwardly directed portions 11, which are illustrated as being substantially tubular in shape having hollow interior receiving chambers 12 therein provided with and slidably carrying two laterally spaced extension arm portions, indicated generally at 13, each having upper ends 14, which are substantially cylindrical and of a size such as to be closely slidably received within the cylindrical receiving chambers 12 of the spaced portions 11 of the bifurcated housing 10 for vertical slidable movement with respect thereto. It should be noted that each of the laterally spaced slidable extension arms or portions 13 is also provided with a flattened enlarged lower end 15 adapted to rotatably carry therebetween grinding means comprising two rotatable grinding members, indicated generally at 16, formed of suitable abrasive material such as Carborundum or the like, although not specifically so limited, and having transversely opposed convex grinding surfaces 17. It should be noted that each of the opposed grinding members 16 is adapted to be received within and carried by the corresponding one of an opposed pair of rotatable outer drive wheels, indicated generally at 18, and each of which includes a circumferential outer drive portion 19 extending beyond the outermost or lowermost ends of the extension arms or portions 15 for frictional engagement with an auxiliary surface, such as a table surface or the hand of a person who wishes to sharpen a knife as the knife sharpener is moved with respect thereto, whereby to rotate the outer drive wheels 18 and the grinding members 16, which are locked therewithin by interlocking means comprising alternate circumferential projections 20 carried by the grinding member 16 and alternate circumferential projections 21 carried by the corresponding outer drive wheel 18. This rotation of the outer drive wheels 18 and grinding members 16 carried thereby is permitted by reason of their pivotal and resiliently adjustable mounting with respect to the lower ends 15 of the extension arms or portions 13 by means of a transverse axle or pivot pin 22 mounted in aligned apertures 23 of said lower ends 15, with centrally apertured portions 24 of the drive wheels 18 and centrally apertured portions 25 of the grinding members 16 rotatably mounting them on the axle 22 with resilient means comprising an elastomeric O-ring 28 interposed between each of the grinding members 16 and the transverse axle 22 whereby to allow relative positional adjustment of the opposed grinding surfaces 17 to accommodate to the irregularities of a knife edge 29 of a knife blade 30 engaged therebetween. Furthermore, convex resilient washer means 31 are positioned so as to bias the opposed grinding members 16 toward each other whereby to facilitate the above-mentioned relative positional adjustment of the opposed grinding surfaces 17 to accommodate various sizes, thicknesses, and shapes of knife edge and also any knife edge irregularities of a knife blade engaged between the opposed grinding surfaces 17.

It should be noted that the bifurcated housing 10 has a central portion 32 which, together with portions 11 thereof and the extension portions or arms 13, effectively define therebetween a knife-receiving slot 33. The central portion 32 of the housing is provided with grooved knife-back guide roller means 34 positioned at the back edge of the knife-receiving slot 33 for rotation in a plane bisecting said slot. The roller 34 is adapted to receive the back edge 35 of the knife 30 whereby to hold it in directly aligned relationship with respect to a plane passing directly between the opposed grinding members 16.

It should be noted that the portions 11 of the bifurcated housing 10 and the slidable extension arms or portions 13 are effectively provided with adjustable biasing spring means, indicated generally at 36, for normally biasing the extension portions 13 into retracted position with respect to the bifurcated housing 10. In the specific form illustrated in FIGS. 1–5, the biasing spring means 36 includes two threaded connector elements 37 carried in apertures 38 on each side of the bifurcated housing 10 and downwardly directed into the hollow tubular receiving chambers 12 and there being provided with threaded portions 39 threadedly engaging non-rotatively mounted threaded nut means 40. It should be noted that each of the threaded nut means 40 is connected to first ends of two coil tension springs 41, each of which has its second end connected interiorly to the corresponding extension arm portion 13 adjacent the lower end of the interior chamber 42 therein. The arrangement is such that each of the tension springs 41 exerts tension on each of the threaded nuts 40 and, thereby, on each of the connector elements 37, which have exterior actuating heads 43 abutting the top of the bifurcated housing 10 whereby to normally forcibly bias the extension arms or portions 13 upwardly with respect to the housing 10 in a manner such as to cause the opposed grinding surfaces 17 of the grinding members 16 to be forced upwardly against the knife edge 29, with the back edge 35 of the knife being firmly engaged in the roller 34. This arrangement allows virtually any size of knife blade to be positioned in the knife-receiving slot 33 for effective sharpening by the device of the present invention, which occurs by engaging the projecting circumferential outer drive portions 19 of the drive wheels 18 and effectively rotating same with respect to the knife edge 29.

It should be noted that the interior chamber 42 in each of the extension portions or arms 13 is of keyed or non-round cross-sectional configuration. In the form illustrated for exemplary purposes, this takes the form of a square cross-sectional configuration for each of the chambers 42 whereby to non-rotatively but longitudinally slidably mount each of the threaded nut members 40 therein. However, various other keying arrangements may be provided.

FIGS. 6 and 7 illustrate a slight modification of the grinding wheels designated by the reference numeral 16 in the first form of the present invention and designated by the reference numeral 16A in this modification of the invention. In this modified form, each of the grinding members 16A comprises an inner grinding element 44 of suitable abrasive material such as Carborundum, or the like, although not specifically so limited, adapted to be received within an outer carrier 45, which may be made of molded plastic, metal, or any other suitable material, with said outer carrier 45 being provided with the alternate projections 20A comprising the interlocking means for locking same with respect to the projections 21A carried by the corresponding outer drive wheel 18A. In this modification, it should be noted that the outer carrier 45 tightly frictionally receives the inner grinding element 44 and has a central sleeve portion 25A defining the central aperture and being integrally provided with the resilient portion 28A, which is adapted to resiliently engage the transverse axle such as is shown at 22 in FIG. 3.

It is understood that the invention may include two convex washers, such as shown at 31, or one of these may be eliminated in certain forms of the invention. Also, said convex resilient washers may be modified or repositioned in certain forms of the invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A knife sharpener, comprising: a bifurcated housing provided with and slidably carrying laterally spaced extension arm portions, said bifurcated housing and said extension arm portions defining therebetween a knife-receiving slot; biasing spring means effectively interconnecting said extension arm portions and said housing and biasing said extension portions into telescopically retracted position with respect to said housing; two rotatable grinding members of abrasive material having transversely opposed convex grinding surfaces, said opposed grinding members being provided with and rotatably mounted upon transverse axle means carried by said extension arm portions; and rotatable outer drive wheels rotatably mounted on said transverse axle means and carrying said grinding members therein, and each being provided with a circumferential outer drive portion extending beyond the outermost ends of said extension arm portions for frictional engagement with an auxiliary surface, as said knife sharpener is drawn therealong, whereby to rotate the grinding members and sharpen a knife edge received between the opposed convex grinding surfaces thereof when a knife blade is carried within said knife-receiving slot.

2. A knife sharpener of the character defined in claim 1, wherein each of said outer drive wheels and the grinding member carried thereby is provided with interlocking means for removably interengaging each of the grinding members within its corresponding outer drive wheel.

3. A knife sharpener of the character defined in claim 1, wherein each of said grinding members comprises an inner grinding element provided with and received within an outer carrier having interlocking means for removable engagement with the corresponding outer drive wheel.

4. A knife sharpener of the character defined in claim 1, including convex resilient washer means transversely biasing said opposed grinding members toward each other, said washer means being carried on at least one end of said transverse axle means between one of said outer drive wheels and the adjacent extension arm portion.

5. A knife sharpener of the character defined in claim 1, including resilient means interposed between each of the grinding members carried by the outer drive wheels and the transverse axle means to allow relative positional adjustment of the opposed grinding surfaces to accommodate to the irregularities of a knife edge engaged therebetween.

6. A knife sharpener of the character defined in claim 1, wherein said housing is provided with grooved knife-back guide roller means positioned at the back edge of said knife-receiving slot for rotation in a plane bisecting said slot.

7. A knife sharpener of the character defined in claim 1, wherein said extension arm portions are hollow and upwardly open, and wherein said biasing spring means includes two threaded connector elements carried by the housing and extending downwardly into the corresponding hollow extension arm portions and there being provided with and threadedly engaging non-rotatively mounted threaded nut means slidably and non-rotatively mounted in the corresponding hollow extension arm portions, and further including two coiled tension springs connected to the corresponding threaded nut means at first ends thereof and having second ends connected interiorly to the corresponding hollow extension arm portions, whereby exterior rotation of said threaded connector elements will threadedly and slidably move the corresponding threaded nut means and correspondingly change the effective length of the corresponding tension spring.

References Cited in the file of this patent

UNITED STATES PATENTS

| | | |
|---|---|---|
| 1,342,275 | Cornell | June 1, 1920 |

FOREIGN PATENTS

| | | |
|---|---|---|
| 131,130 | Great Britain | Aug. 12, 1919 |
| 644,875 | Germany | July 30, 1935 |